United States Patent
Chan et al.

(10) Patent No.: US 7,130,793 B2
(45) Date of Patent: Oct. 31, 2006

(54) SYSTEM AND METHOD FOR MINIMIZING OVERRUN AND UNDERRUN ERRORS IN PACKETIZED VOICE TRANSMISSION

(75) Inventors: Norman C. Chan, Louisville, CO (US); Sharmistha Sarkar Das, Broomfield, CO (US)

(73) Assignee: Avaya Technology Corp., Basking Ridge, NJ (US)

(*) Notice: Subject to any disclaimer, the term of this patent is extended or adjusted under 35 U.S.C. 154(b) by 781 days.

(21) Appl. No.: 10/117,162

(22) Filed: Apr. 5, 2002

(65) Prior Publication Data

US 2003/0191631 A1    Oct. 9, 2003

(51) Int. Cl.
*G10L 19/00* (2006.01)

(52) U.S. Cl. .................. 704/201; 704/215; 704/219; 379/266.04; 379/283

(58) Field of Classification Search ........ 704/219–220, 704/205–209, 262, 230, 222, 227, 215–216; 379/266.04, 281–283
See application file for complete search history.

(56) References Cited

U.S. PATENT DOCUMENTS

| | | | | |
|---|---|---|---|---|
| 5,611,018 A * | 3/1997 | Tanaka et al. | ............. | 704/215 |
| 5,717,823 A * | 2/1998 | Kleijn | ........................ | 704/220 |
| 6,223,151 B1 * | 4/2001 | Kleijn et al. | ................ | 704/207 |
| 6,873,954 B1 * | 3/2005 | Sundqvist et al. | .......... | 704/262 |
| 6,931,373 B1 * | 8/2005 | Bhaskar et al. | ............. | 704/230 |

* cited by examiner

*Primary Examiner*—Richemond Dorvil
*Assistant Examiner*—Huyen X. Vo
(74) *Attorney, Agent, or Firm*—John C. Moran

(57) ABSTRACT

When it is determined that a sample queue exceeds a first predefined level, samples being received from a IP switched network are modified such that samples are removed within the voiced region of the samples by removing whole pitch periods of samples. If the sample queue is below a second predefined number, additional samples are placed into the queue by analyzing voiced samples from the IP switched network and generating additional pitch periods of samples.

16 Claims, 7 Drawing Sheets

SYSTEM AND METHOD FOR MINIMIZING OVERRUN AND UNDERRUN ERRORS IN PACKETIZED VOICE TRANSMISSION

TECHNICAL FIELD

This invention relates to the transmission of digitally encoded voice, and in particular, to the transmission of digitally encoded voice between a circuit switching network and a packet switching network so as to maintain speech quality.

BACKGROUND OF THE INVENTION

In the transmission of digitally encoded voice, it is important to maintain synchronization between the two end points so that no digital information is lost due to differing rates of transmission and reception. Synchronization is the ability to maintain a stable frequency and precise timing to allow digital transmission services to read data out and read data into the transmission system at the same rate. Without synchronization, rates differ and data slippage occurs resulting in data being lost. Within the prior art, circuit switch networks and packet data switching networks when operating independently of each other have solved this problem in the following manner. In circuit switched networks, synchronization is centrally located and is synchronized throughout continental United States. For example, long distance transmission carriers, such as AT&T, have placed synchronization technologies in there central offices and relied on T1 trunk-based recovery network timing subsystems to synchronize data being received from the network. Packet switched network have allowed the receiving endpoint to signal the transmitting endpoint to slow or speed-up the transmission rate. This type of control is utilized in asynchronous transfer mode (ATM) and frame relay transmission (FR). However, the internet protocol (IP) transmission systems provide no such synchronization mechanism even though they are packet switched networks.

The prior art methods for achieving synchronization in circuit switched networks and packet switched network performed well if the two types of networks were not interconnected. An exception to this situation was in the situation where ATM or frame relay was utilized with a circuit switched network with the same data transmission company controlling both systems. Within the present business communication switching environment, there exists a need for simplified maintenance, management, and access to voice information on diverse networks. This need is forcing the convergence of a variety of circuit switched and packet switched networks. In addition, a new class of real-time multimedia networks is emerging that will also require synchronization.

The combination of a circuit switched network and a packet switched network is referred to as a hybrid network. Hybrid networks that lack synchronization exhibit the same symptoms as if packets were being lost within a packet switching system with some asymmetry. (1) If the read-out is faster than the read-in, eventually the reader exhausts the jitter-buffers and must wait for them to refill. The voice coder sees an empty stream of voice information and hence the voice quality suffers remarkably. (2) If the read-out is slower than the read-in, eventually the jitter-buffers fill full, and new packets are discarded. The voice coder sees a loss of packets and again the voice quality suffers. If the buffers are made too large, the delay in transmitting voice information from one person to another person is increased. It is well known that a large delay in voice transmission is objectionable to people. The delay is increased as the buffers are made larger, because the speech samples spend more time in the buffers.

Figure 1:
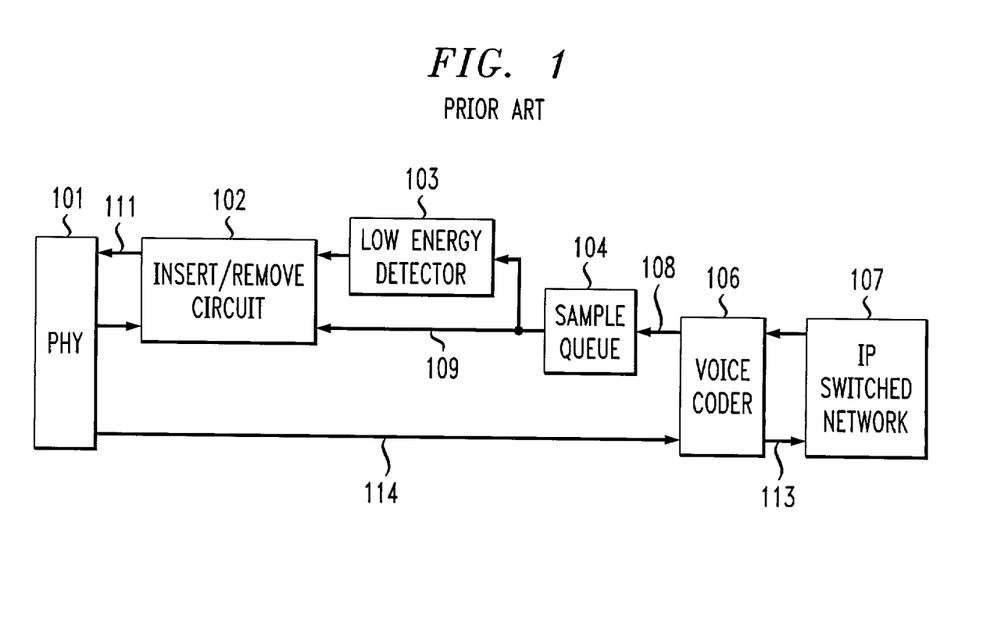
FIG. 1 illustrates a prior art system.

A prior art solution for interconnecting a hybrid network is illustrated in FIG. 1. Synchronous physical (PHY) interface 101 is reading out PCM voice samples to voice coder 106 via path 114. Voice coder 106 transmits these PCM packets via path 113 to IP switched network 107. IP switch network 107 transmits packets containing PCM samples to voice coder 106 which transmits these to PHY 101 via elements 102, 103, and 104 and paths 108, 109, and 111. PHY 101 utilizes insert/remove circuit 102 to obtain the packets that are being placed in sampled queue 104 by voice coder 106. Insert/remove circuit 102 adds or deletes PCM samples as required to maintain a synchronous transfer of data to PHY 101. Insert/remove circuit 102 performs this activity by utilizing low energy detector 103. Low energy detector 103 evaluates the PCM sample that will next be transmitted from sample queue 104 to circuit 102 via path 109. Low energy detector 103 indicates to circuit 102 if the energy contained within the PCM sample is below a predefined threshold and may be discarded. If there is not a sample present in sample queue 104 and a sample is required to be transmitted to PHY 101, insert/remove circuit 102 transmits a low energy PCM sample. When insert/remove circuit 102 has to delete samples being received from sample queue 104, circuit 102 deletes any present sample indicated by low energy detector 103 as being below predefined energy value requirement. Circuit 102 commences this operation at some predefined capacity of sample queue 104. The problem with this prior art solution is that insert/remove circuit 102 has no knowledge of the number or location of PCM samples that are below the predefined energy value within sample queue 104. Hence, for example, if circuit 102 determines that it must delete five PCM samples, circuit 102 will delete the next five PCM samples that low energy detector 103 indicates are below the minimum energy level. This can result in deletion of samples over a small period of time and cause deterioration of the voice quality being produced by PHY 101.

SUMMARY OF THE INVENTION

This invention is directed to solving these and other problems and disadvantages of the prior art. When it is determined that a sample queue exceeds a first predefined level, samples being received from a IP switched network are modified such that samples are removed within the voiced region of the samples by removing whole pitch periods of samples. If the sample queue is below a second predefined number, additional samples are placed into the queue by analyzing voiced samples from the IP switched network and generating additional pitch periods of samples.

DETAILED DESCRIPTION

Figure 2:
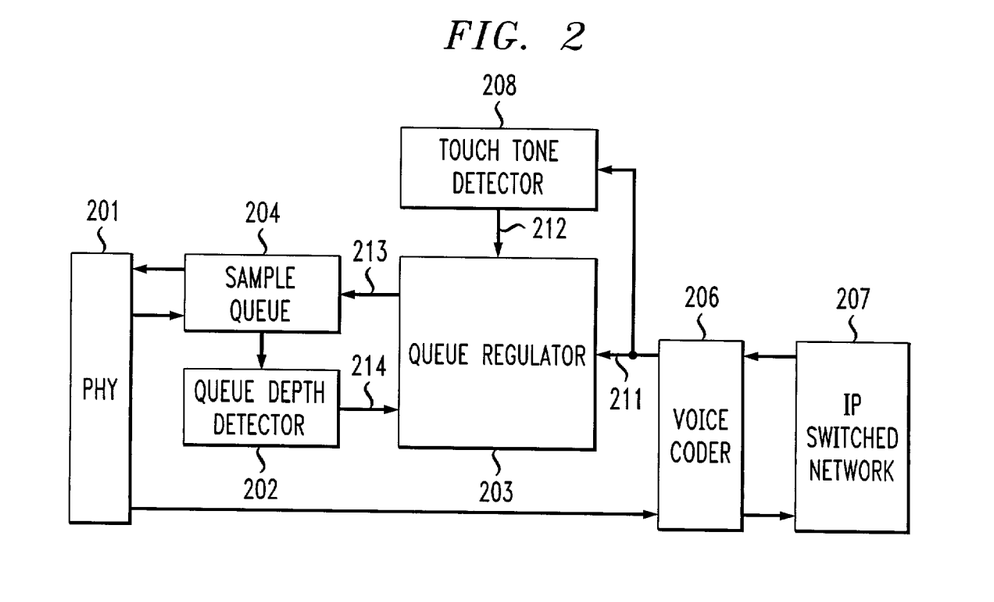
FIG. 2 illustrates an embodiment of the invention.

FIG. 2 illustrates a system for implementing an embodiment of the invention. Synchronous physical (PHY) interface 201 is exchanging digital samples with IP switched network 207 via voice encoder 206. Voice samples being received from IP switched network 207 are received by voice coder 206 and then, processed by elements 202–204 before being transferred to PHY 201. Queue regulator 203 maintains the proper number of samples in sample queue 204. Queue regulator 203 utilizes queue depth detector 202 to determine the number of samples in sample queue 204. When PHY 201 requires another sample, it requests this sample from sample queue 204. PHY 201 removes samples from sample queue 204 at a constant rate. If queue depth detector 202 determines that the number of samples in sample queue 204 is below a first predefined level, queue depth detector 202 transmits a first signal to queue regulator 203. In response to the first signal from queue depth detector 202, queue regulator 203 inserts additional samples into sample queue 204. The additional samples are in addition to the samples being received from voice coder 206. Queue regulator 203 generates the additional samples by performing an autocorrelation of the samples being received from voice coder 206. This autocorrelation is only performed in portions of the speech that are considered to be voiced. After the pitch period is identified, queue regulator 203 prolongs the present speech pattern by adding extra pitch periods of samples that are identical pitch periods identified by autocorrelation in the stream of samples being communicated from voice coder 206 to sample queue 204. A pitch period of samples is the smallest repeating pattern in the voiced part of human speech as is will known by those skilled in the art.

If queue depth detector 202 determines that the number of samples in sample queue 204 is above a second predefined level, queue depth detector 202 transmits a second signal to queue regulator 203. Queue regulator 203 is responsive to the second signal to eliminate some of the samples being received from voice coder 206. The eliminated samples are not stored in sample queue 204 by queue regulator 203. Again, during a voiced period of the speech, buffer regulator 203 determines the pitch period for the speech pattern and eliminates whole pitch periods of samples. This is done because by eliminating an entire pitch period of samples, the pitch of the voice as determined from the samples is not modified.

Touch tone detector 208 is utilized to monitor the samples being received from voice coder 206 by queue regulator 203 to determine when multi-frequency dialing tones (commonly referred to as touch tone frequencies) are being received. Touch tone detector 208 transmit a signal to queue regulator 203 when multi-frequency dialing tones are detected. Queue regulator 203 is responsive to the signal to cease adding or detecting pitch periods of samples. This is done so that the multi-frequency dialing signals are not modified by queue regulator 203.

Figure 3:
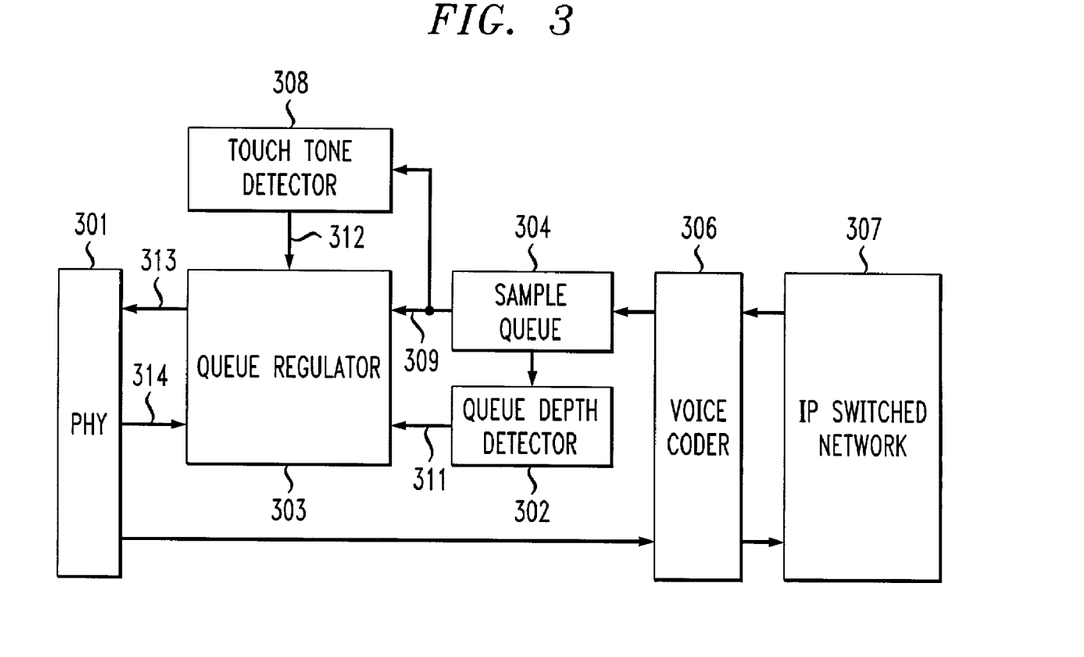
FIG. 3 illustrates another embodiment of the invention.

FIG. 3 illustrates another embodiment of the invention. Elements 301 through 308 perform similar functions to those performed by elements 201 through 208 of FIG. 2. However, queue regulator 303 is situated between PHY 301 and sample queue 304. If the number of samples in sample queue 304 is between the first and second predefined number, queue regulator 303 is responsive to a request from PHY 301 to simply communicate a sample directly from sample queue 304 to PHY 301. However, if the number of samples in sample queue 304 is below the first predefined number, queue regulator 303 inserts additional pitch periods of samples during a voiced period of speech to those samples being retrieved from sample queue 304 and transferred to PHY 301. If sample queue 304 contains a number of samples above the second predefined number, queue regulator 303 will eliminate pitch periods of samples during the voiced periods.

Figure 4:
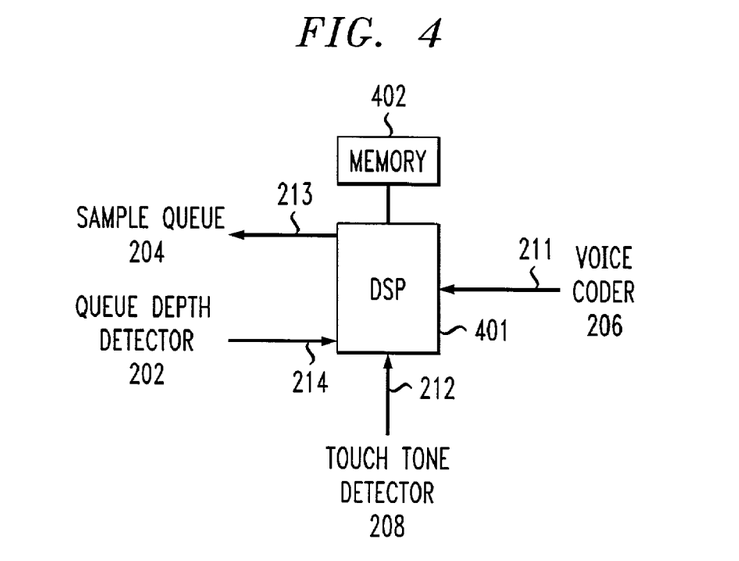
FIG. 4 illustrates an embodiment of, in block diagram form, a queue regulator

FIG. 4 illustrates a block diagram of queue regulator 203 of FIG. 2. DSP 401 in conjunction with memory 402 performs all of the operations illustrated in the flow chart of FIGS. 6 and 7.

Figure 5:
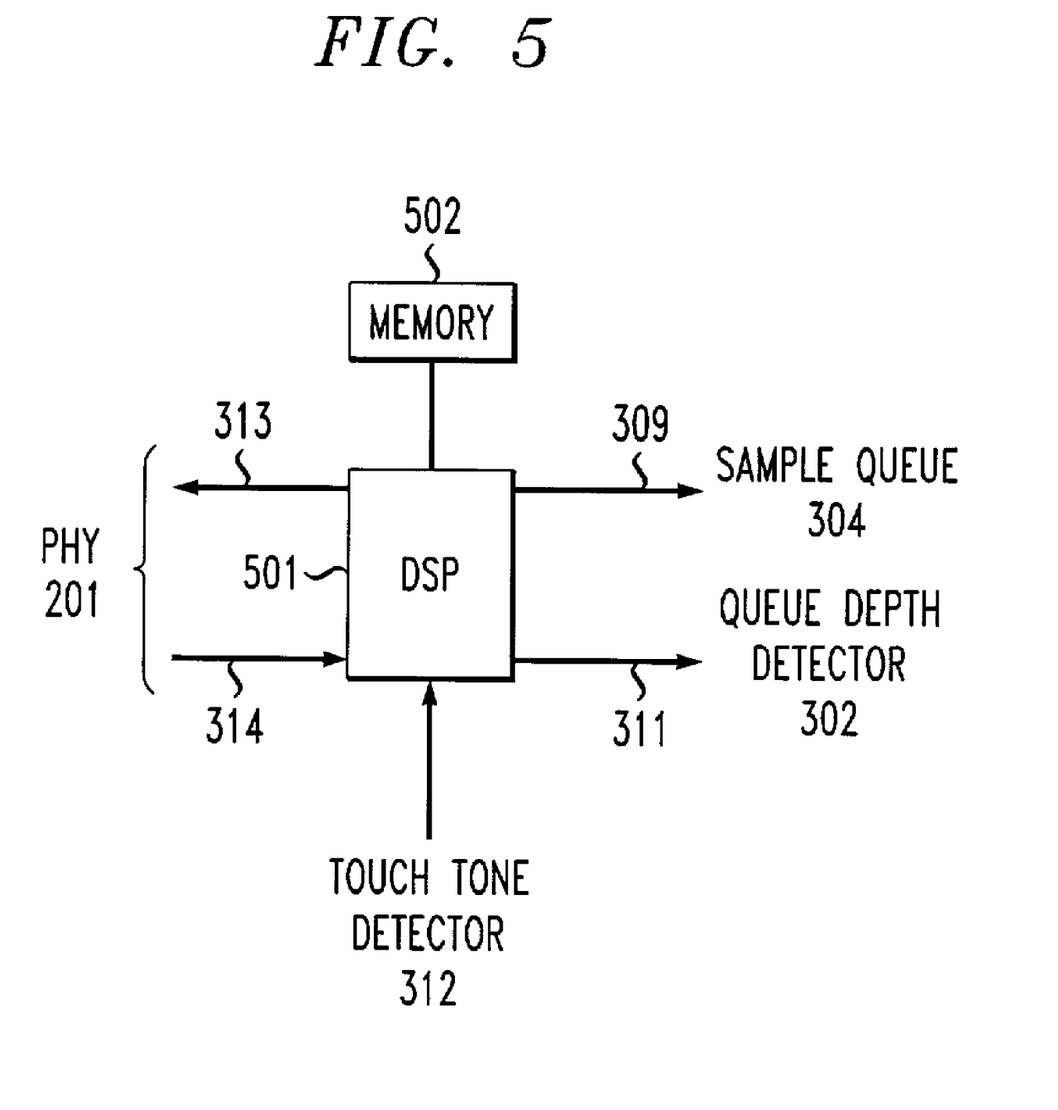
FIG. 5 illustrates another embodiment of, in block diagram form, a queue regulator

FIG. 5 illustrates a block diagram of queue regulator 303 of FIG. 3. DSP 501 in conjunction with memory 502 performs all of the operations illustrated in the flow chart of FIGS. 8 and 9.

Figure 6:
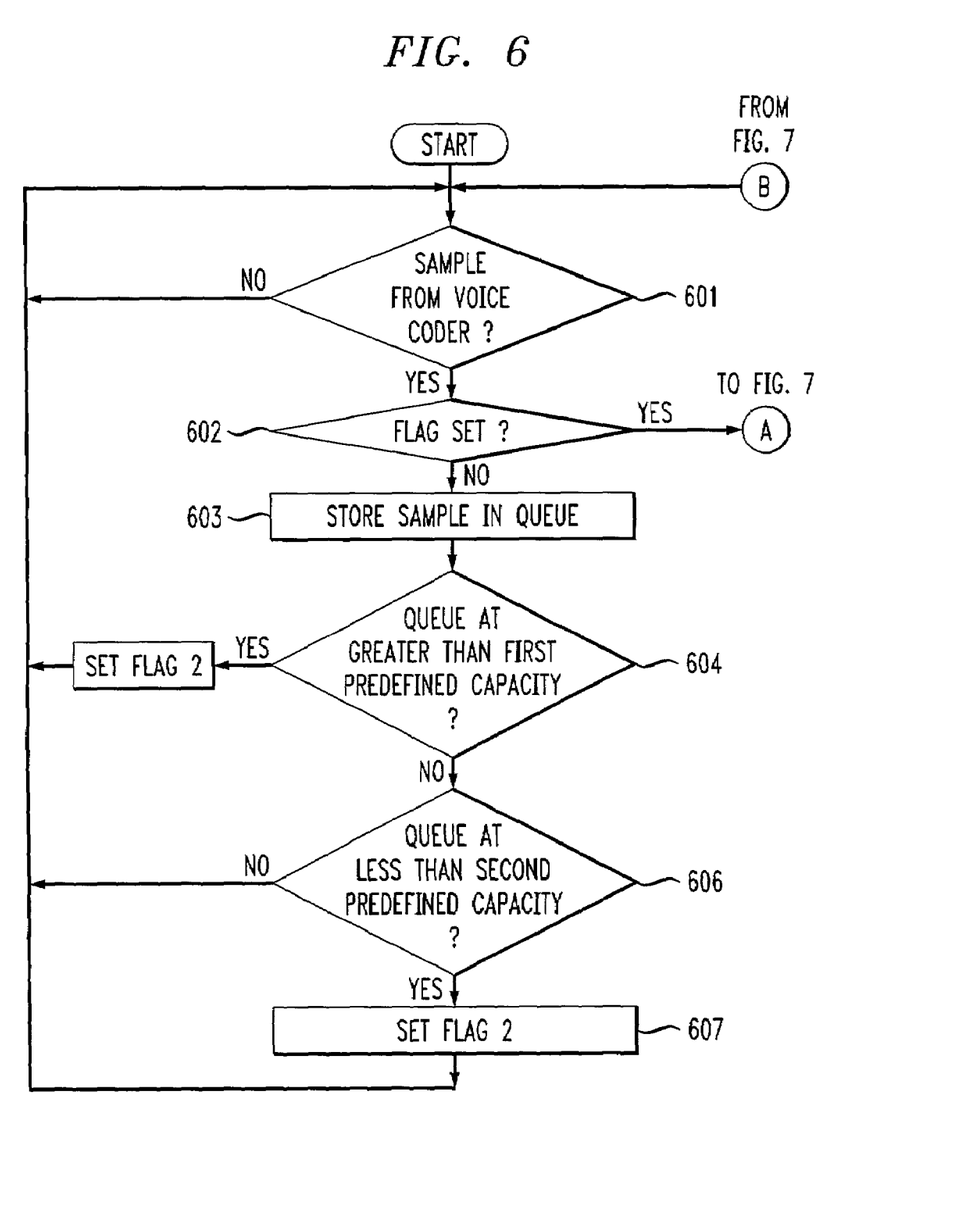
FIGS. 6 and 7 illustrate, in flowchart form, an embodiment of a queue regulator.
Figure 7:
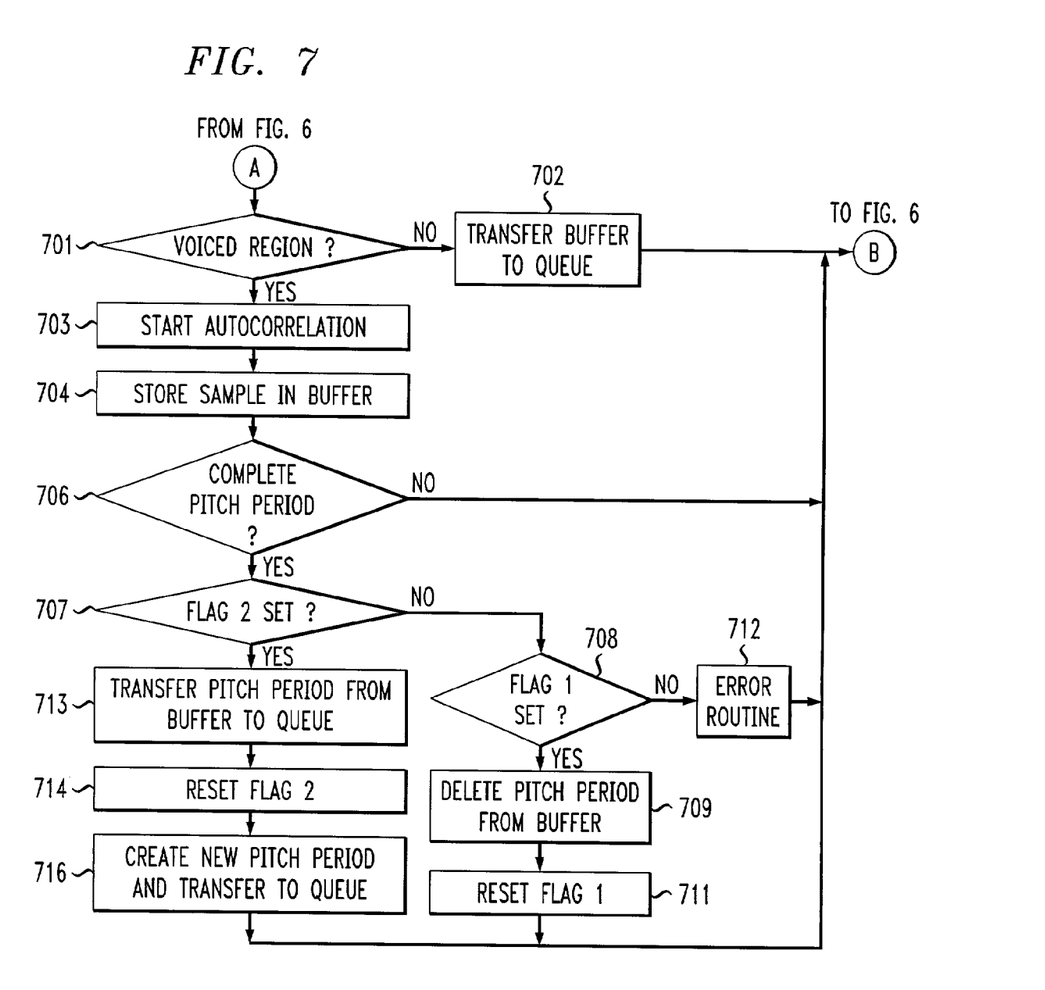

FIGS. 6 and 7 illustrate the steps performed by queue regulator 203 of FIG. 2. Once started, decision block 601 determines if a sample has been received from the voice coder. If the answer is no, decision block 601 is executed again. If the answer in decision block 601 is yes, decision block 602 determines if flag 1 or 2 is set. If the answer is no in decision block 602, block 603 stores the sample into sample queue 204. In response to a signal from queue depth detector 202, decision block 604 then determines if the queue in the sample queue is greater than a first predefined capacity. If the answer is yes, block 608 sets flag 1 and returns control to decision block 601. If the answer in decision block 604 is no, decision block 606 determines if the queue is at less than a second predefined capacity in response to a signal from queue depth detector 202. If the answer is no, control is returned back to decision block 601. If the answer in decision block 606 is yes, block 607 sets flag 2 before returning control back to decision block 601.

Returning now to decision block 602, if flag 1 or 2 is set, decision block 602 transfers control to decision block 701 of FIG. 7. Decision block 701 determines if the voice samples are in a voiced region of speech. If the answer is no, control is transferred to block 702 which transfers the internal buffer that is utilized to store samples during the detection for a pitch period to sample queue 204 before returning control back to decision block 601 of FIG. 6. The contents of the internal buffer is transferred to sample queue 204 by block 702 because these samples are no longer in a voiced region and must be placed in sample queue 204.

If the answer in decision block 701 is yes, block 703 starts or continues the autocorrelation to determine the pitch period before transferring control to block 704 which stores the current sample in the internal buffer of queue regulator 203. Note, one skilled in the art would readily envision that if all of the blocks in FIG. 2 were being performed within one DSP or a wired logic unit, that the internal buffer could well be a shared memory facility. Once decision block 706 receives control from block 704, the latter decision block determines if a complete pitch period has been received of samples. If the answer is no, decision block 706 returns control to decision block 601 of FIG. 6.

If the answer is yes in decision block 706, decision block 707 determines if flag 2 is set. If the answer is yes, this indicates that it is necessary to add a pitch period identical from the one that had just been completed. In response to flag 2 being set, decision block 707 transfers control to block 713 which transfers the just completed pitch period from the internal buffer to sample queue 204. Block 714 then resets flag 2 before transferring control to block 716. Block 716 creates a new pitch period of samples that are identical to the pitch period just completed and transfers this newly created pitch period to sample queue 204 before returning control back to decision block 601 of FIG. 6.

Returning to decision block 707, if the answer is no in decision block 707, control is transferred to decision block 708. Decision block 708 determines if flag 1 is set. If the answer is no, an error has occurred, and control is transferred to block 712 which performs error processing before returning control back to decision block 601 of FIG. 1. If the answer is yes in decision block 708 that flag 1 has been set, control is transferred to block 709 which deletes the just completed pitch period of samples from the internal buffer before giving control to block 711. Block 711 resets flag 1 and returns control back to decision block 601 of FIG. 6.

One skilled in the art could readily envision that multiple pitched periods may be determined before blocks 701–716 would delete or create pitch periods and that more than one pitch period could be deleted or created at one time.

Figure 8:
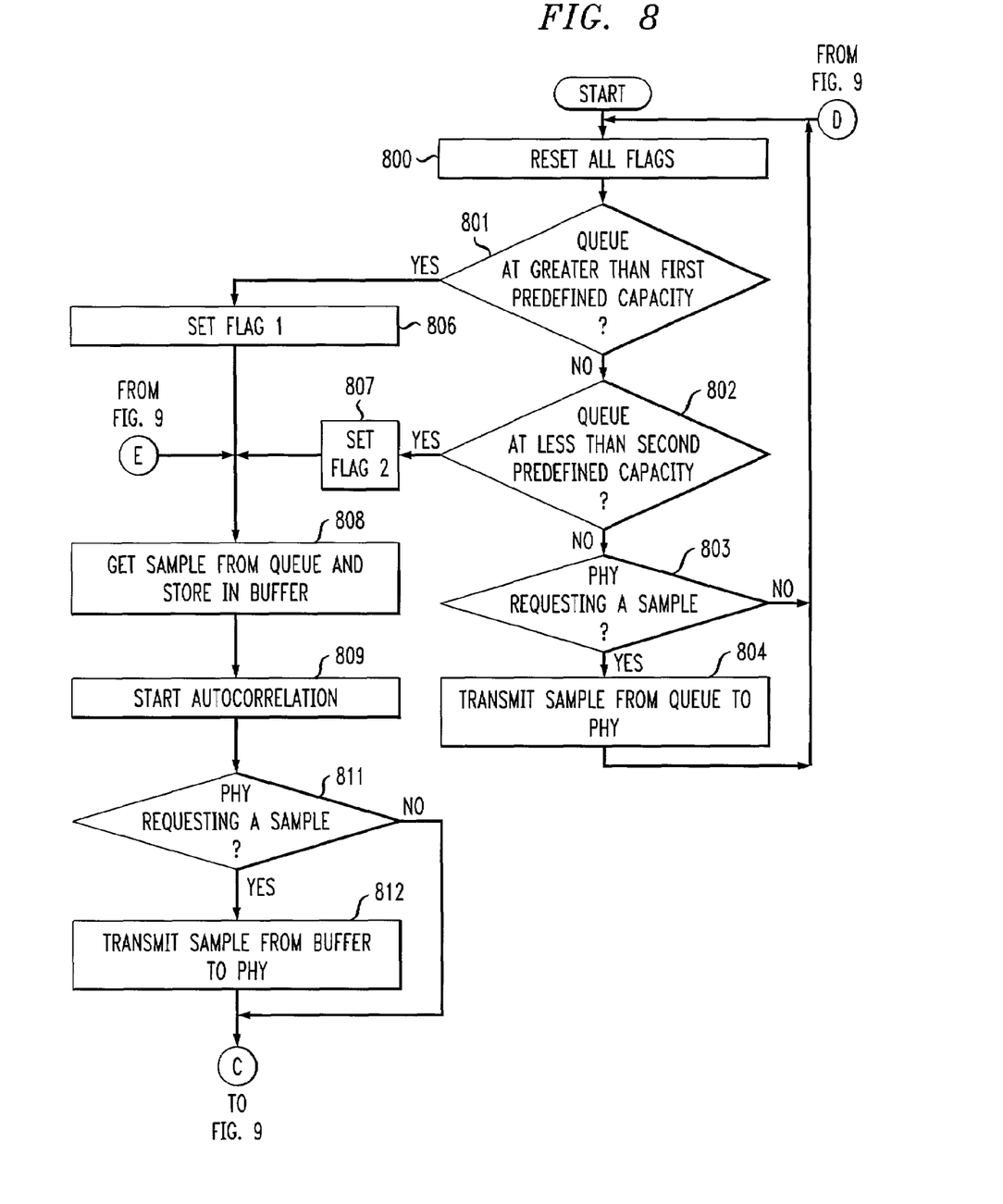
FIGS. 8 and 9 illustrate, in flowchart form, another embodiment of a queue regulator.
Figure 9:
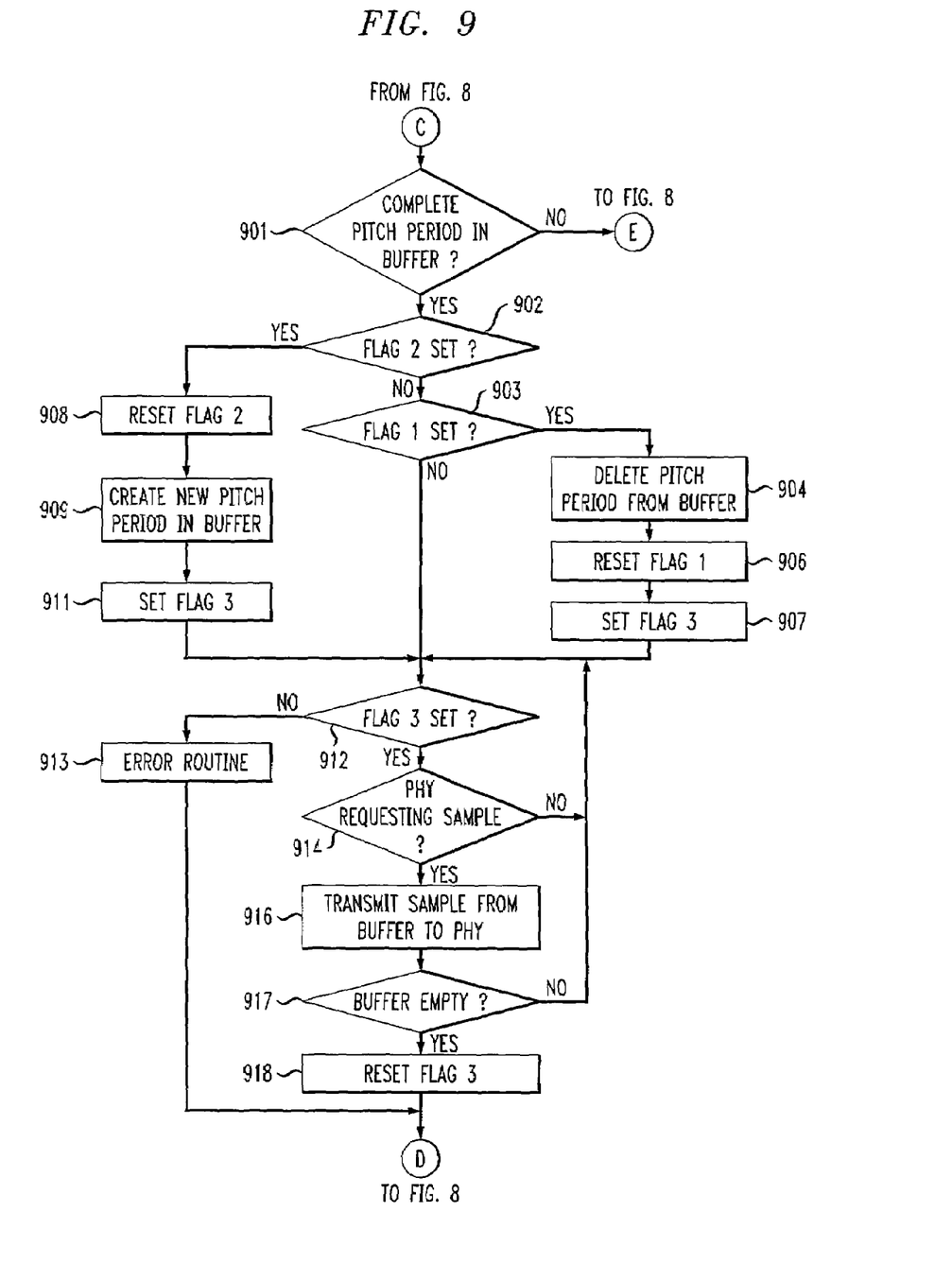

FIGS. 8 and 9 illustrate the steps performed by queue regulator 303 of FIG. 3. Once started, block 800 resets all flags before transferring control to decision block 801. The latter decision block determines if the queue is at a level of samples that is greater than a first defined capacity. If the answer is no, decision block 802 determines if the queue is at a level that is less than a second predefined capacity. If the answer is no in decision block 802, decision block 803 determines if the PHY is requesting a sample. If the answer in decision block 803 is yes, control is transferred to block 804 which transmits a sample from the queue to PHY before returning control back to block 800. If the answer in decision block 803 is no indicating that the PHY is not requesting a sample, control is transferred back to block 800.

If the answer in decision block 801 is yes, block 806 sets flag 1 and transfers control to block 808. If the answer in decision block 802 is yes, block 807 sets flag 2 and transfers control to block 808.

Block 808 gets a sample from the queue and stores this sample in an internal buffer of the queue regulator 303 before transferring control to block 809. Block 809 starts the autocorrelation which is performed during voiced portions of the human speech before transferring control to decision block 811. The latter decision block determines if the PHY is requesting a sample. If the answer is yes, block 812 transmits a sample from the internal buffer to the PHY before transferring control to decision block 901 of FIG. 9. If the answer in decision block 811 is no, control is transferred to decision block 901 of FIG. 9.

Decision block 901 determines if a complete pitch period is stored in the internal buffer. If the answer is no, control is transferred back to block 808 of FIG. 8 so that additional samples can be extracted from the queue and stored in the internal buffer. If the answer in decision block 901 is yes, decision block 902 determines if flag 2 is set. If the answer is no in decesion block 902, decision block 903 determines if flag 1 is set. If the answer is no in decision block 903, control is transferred to decision block 912. Returning to decision block 903, if the answer in decision block 903 is yes, control is transferred to block 904 which deletes a pitch period from the internal buffer before transferring control to block 906. One skilled in the art would readily realize that more than one pitch period could be deleted at a time by a block such as 904. Block 906 resets flag 1 and transfers control to block 907. Block 907 sets flag 3. When set, flag 3 indicates that the queue regulator is to transmit samples from the internal buffer and not from the queue. After setting flag 3, block 907 transfers control to decision block 912.

Returning to decision block 902, if flag 2 is set, control is transferred to block 908 which resets flag 2 before transferring control to block 909. The latter block creates a new pitch period identical to the pitch period already in the internal buffer and stores this newly created pitch period in the internal buffer. Block 911 then sets flag 3 before transferring control to decision block 912.

Decision block 912 determines if flag 3 is set. If the answer is no, control is transferred to block 913 which performs error recovery before transferring control back to block 800 of FIG. 8. If the answer in decision block 912 is yes, decision block 914 determines if the PHY is requesting another sample. If the answer is no in decision block 914, control is transferred back to decision block 912. If the answer in decision block 914 is yes, block 916 transmits a sample from the internal buffer to the PHY before transferring control to decision block 917. The latter decision block determines if the internal buffer is empty. If the answer is no, control is transferred back to decision block 912. If the answer is yes, block 918 resets flag 3 before returning control back to block 800 of FIG. 8. Since the internal buffer is empty, it is time to resume extracting samples from the queue when the PHY requests another sample.

Of course, various changes and modifications to the illustrative embodiment described above will be apparent to those skilled in the art. Such changes and modifications can be made without departing from the spirit and scope of the invention and without diminishing its intended advantages. It is therefore intended that such changes and modifications be covered by the following claims except in so far as limited by the prior art.

What is claimed is:

1. A method for regulating a flow of digital voice samples, comprising the steps of:
   storing the voice samples in a queue;
   analyzing the voice samples for pitch periods;
   detecting for the presence of multi-frequency dialing tones;
   detecting storage capacity of the queue;
   detecting that to many voice samples have been received and stored in the queue; and
   deleting a pitch period from the received voice samples stored in the queue if the presence of multi-frequency dialing tones is not detected by said detecting for the presence of multi-frequency dialing tones and if the capacity of the queue has been exceeded as indicated by said detecting stored capacity of the queue.

2. The method of claim 1 further comprises the steps of detecting when not enough voice samples have been received; and
   adding a pitch period of voice samples to the received voice samples.

3. The method of claim 2 wherein the step of adding comprises the step of generating a pitch period of voice samples similar to the most recently analyzed pitch period.

4. The method of claim 2 further comprises the step of storing voice samples in a queue;
   the step of detecting comprises the step of identifying that the queue is approaching minimum capacity; and
   the step of adding comprises the step of inserting the pitch period of voice samples before storage into the queue.

5. The method of claim 4 wherein the added pitch period of voice samples is similar to the most recently analyzed pitch period.

6. The method of claim 2 further comprises the step of storing voice samples in a queue;

the step of detecting comprises the step of identifying that the queue is approaching minimum capacity; and the step of adding comprises the step of inserting the pitch period of voice samples after storage into the queue.

7. The method of claim 6 wherein the added pitch period of voice samples is similar to the most recently analyzed pitch period.

8. The method of claim 1 wherein the step of deleting comprises the step of removing a pitch period of voice samples similar to the most recently analyzed pitch period.

9. The method of claim 1 further comprises the step of storing voice samples in a queue;

the step of detecting comprises the step of identifying that the queue is approaching maximum capacity; and the step of deleting comprises the step of removing the deleted pitch period of voice samples before storage into the queue.

10. The method of claim 9 wherein the removed pitch period of voice samples is similar to the most recently analyzed pitch period.

11. The method of claim 1 further comprises the step of storing voice samples in a queue;

the step of detecting comprises the step of identifying that the queue is approaching maximum capacity; and the step of deleting comprises the step of removing the deleted pitch period of voice samples after storage into the queue.

12. The method of claim 11 wherein the removed pitch period of voice samples is similar to the most recently analyzed pitch period.

13. An apparatus for communicating voice samples from a receiver to an interface, comprising:

a queue;

a multi-frequency dialing tone detector;

a queue depth detector for indicating the storage capacity of the queue; and a queue regulator for analyzing voice samples for pitch periods, deleting a pitch period of voice samples if the queue depth detector indicates queue capacity being exceeded and if a presence of multi-frequency dialing tones is not detected by the multi-frequency dialing tone detector, and storing remaining voice samples received from the receiver in the queue.

14. The apparatus of claim 13 further a circuit for removing voice samples from queue and transmitting the removed voice samples to the interface.

15. The apparatus of claim 13 wherein queue regulator further responsive to the queue depth detector indicating that queue capacity being under used to add a pitch period of samples to the received voice samples before storing the queue.

16. An apparatus for communicating voice samples from a receiver to an interface, comprising:

means for storing voice samples in a queue from the receiver;

means for detecting pitch period in the voice samples;

means for detecting for the presence of multi-frequency dialing tones;

means for determining a queue capacity of the means for storing;

means responsive to the means for storing being above a first predefined queue capacity for deleting a pitch period of voice samples from the receiver if the presence of multi-frequency dialing tones is not detected by the means of detecting for the presence of multi-frequency dialing tones thereby preventing the queue capacity from being exceeded; and means responsive to the means for storing being below a second predefined queue capacity for adding a pitch period of voice samples if the presence of multi-frequency dialing tones is not detected by the means of detecting for the presence of multi-frequency dialing tones thereby preventing the voice samples stored in the queue capacity from being exhausted.

* * * * *